United States Patent [19]
Aiba et al.
[11] 4,401,990
[45] Aug. 30, 1983

[54] NOZZLE CLEANING DEVICE IN AN INK JET SYSTEM PRINTER

[75] Inventors: Masahiko Aiba; Yoichi Yamamoto, both of Nara; Hiroji Iwai, Yamatokoriyama; Ikuo Umeda, Nara, all of Japan

[73] Assignee: Sharp Kabushiki Kaisha, Osaka, Japan

[21] Appl. No.: 292,916

[22] Filed: Aug. 14, 1981

[30] Foreign Application Priority Data

Aug. 28, 1980 [JP] Japan ........ 55-119409
Jan. 13, 1981 [JP] Japan ........ 56-4493

[51] Int. Cl.[3] ........ G01D 15/18
[52] U.S. Cl. ........ 346/75; 346/140 R
[58] Field of Search ........ 346/75, 140 PD, 140 IJ

[56] References Cited

U.S. PATENT DOCUMENTS 4,199,767 4/1980 Campbell et al. ........ 346/75
4,300,145 11/1981 Raamsdonk ........ 346/140 PD

*Primary Examiner*—George H. Miller, Jr.
*Attorney, Agent, or Firm*—Birch, Stewart, Kolasch & Birch

[57] ABSTRACT

An ink jet system printer of the charge amplitude controlling type includes a carriage travelling across the printing region. A nozzle for emitting ink droplets and a slidable member are disposed on the carriage. The slidable member supports a charging tunnel and a cleaning pad for cleaning the front surface of the nozzle. When the carriage is positioned at the leftmost position before initiating the actual printing operation, the slidable member is slided on the carriage so that the cleaning pad contacts the front surface of the nozzle for cleaning purposes. Thereafter, the slidable member is held stationary on the carriage at a position wherein the charging tunnel confronts the nozzle.

8 Claims, 10 Drawing Figures

NOZZLE CLEANING DEVICE IN AN INK JET SYSTEM PRINTER

BACKGROUND AND SUMMARY OF THE INVENTION

The present invention relates to an ink jet system printer and, more particularly, to a nozzle cleaning device in an ink jet system printer of the charge amplitude controlling type.

When an ink droplet issuance operation is interrupted in an ink jet system printer, there is a possibility that a small amount of ink liquid attaches to the front surface of a nozzle around the orifice portion thereof. Further, there is a possibility that a small amount of ink liquid may leak out from the orifice of the nozzle because of the thermal contraction of the ink liquid supply system while the ink droplet issuance operation is interrupted. The thus developed ink liquid attaches to the front surface of the nozzle around the orifice portion thereof. The attached ink liquid will have an influence on the droplet formation condition and prevent an accurate printing operation. Moreover, the attached ink liquid may solidify to block the orifice portion of the nozzle.

To prevent the above-mentioned solidification, it has been proposed to cover the orifice portion of the nozzle when the ink droplet issuance operation is not conducted through the use of a suitable cap member. However, the tight covering is not easily conducted. Moreover, the ink liquid attached to the front surface of the nozzle may change its chemical characteristic even though the ink liquid will not solidify. Thus, the conventional system can not ensure a stable droplet formation operation.

Accordingly, an object of the present invention is to provide an ink jet system printer which ensures a stable droplet formation operation.

Another object of the present invention is to provide a nozzle cleaning device for cleaning a front surface of a nozzle in an ink jet system printer of the charge amplitude controlling type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a nozzle cleaning element such as a liquid absorptive pad contacts with the front surface of the nozzle when the ink droplet formation operation is not conducted. In a preferred form, the nozzle cleaning element is usually located at a standby position away from the front surface of the nozzle in order not to disturb the printing operation. When the main power supply is thrown, the nozzle cleaning element is first shifted to clean the front surface of the nozzle, and then held at the standby position for ensuring an accurate printing operation.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

An ink jet system printer of the charge amplitude controlling type comprises an ink liquid supply system, including an ink liquid reservoir, an ink liquid supply pump and an electromagnetic valve, for supplying ink liquid toward an ink droplet issuance unit 10 through a conduit 12.

Figure 2:
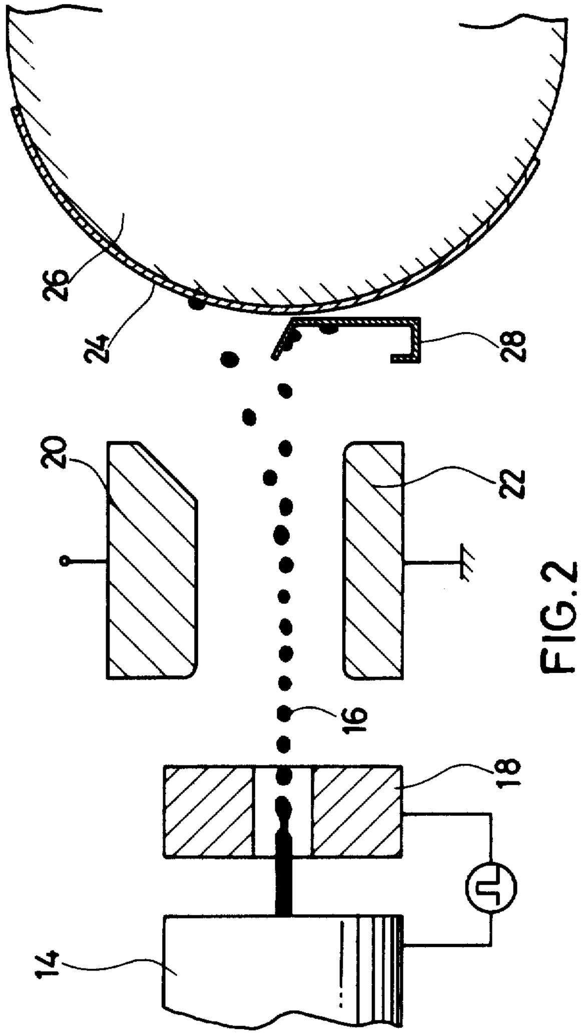
FIG. 2 is a sectional view taken along line II—II of FIG. 1 for explaining an operation principle of the ink jet system printer of the charge amplitude controlling type.

The ink droplet issuance unit 10 includes a nozzle 14 and an electromechanical transducer secured to the nozzle 14 for vibrating the nozzle 14 at a given frequency. Thus, the nozzle 14 emits ink droplets 16 at the given frequency. The thus formed ink droplets 16 are charged by a charging tunnel 18 in accordance with print information. The charged ink droplets are deflected while they pass through a constant high voltage electric field established by a pair of deflection electrodes 20 and 22 in accordance with the charge amount carried thereon. The deflected ink droplets are directed to a recording paper 24 supported by a platen 26 as shown in FIG. 2 for recording a desired pattern in a dot matrix fashion. Ink droplets not contributing to the actual printing operation are not charged and directed to a beam gutter 28 for recirculation purposes. The ink liquid collected by the beam gutter 28 is returned to the ink liquid reservoir through a conduit 30.

A pair of guide rails 32 and 34 are disposed to parallel the platen 26. A carriage 36 is slidably mounted on the pair of guide rails 32 and 34. The above-mentioned ink droplet issuance unit 10, the charging tunnel 18, the pair of deflection electrodes 20 and 22 and the beam gutter 28 are mounted on the carriage 36. One end of a drive wire 38 is fixed to one side wall of the carriage 36, and the other end of the drive wire 38 is fixed to the opposing side wall of the carriage 36. The drive wire 38 is extended between a pulley 40, which is rotatably supported by a housing wall 42, another pulley 44, which is rotatably supported by the opposing housing wall 46, and a drive pulley 48. The drive pulley 48 is connected to a motor 50 for reciprocating the carriage 36 in a forward direction 52 and the backward direction.

Figure 5:
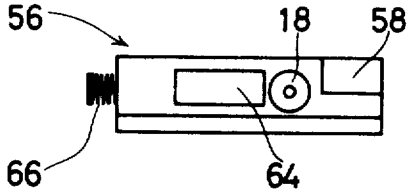
FIG. 5 is a front view of a slidable member included in the ink jet system printer of the charge amplitude controlling type of FIG. 1.
Figure 6:
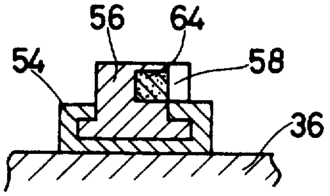
FIG. 6 is a sectional view of the slidable member of FIG. 5 taken along line VI—VI of FIG. 1.

A guide member 54 is secured to the carriage 36 as shown in FIG. 6 for slidably supporting a slidable member 56. The charging tunnel 18 is disposed in the slidable member 56 as shown in FIG. 5. A stopper 58 is integrally secured to the slidable member 56. In the normal operation mode, the stopper 58 contacts the side wall of the ink droplet issuance unit 10 so that the charging tunnel 18 confronts an orifice portion 60 of the nozzle 14. The actual printing operation is conducted while the carriage 36 is driven to travel in the forward direction 52, wherein the slidable member 56 is located in the normal position. When one line of printing is completed, the slidable member 56 contacts a damper spring 62 which is secured to the housing wall 42.

A liquid absorptive pad 64 is buried in the slidable member 56. The liquid absorptive pad 64 is preferably made of a nonwoven cloth for effectively absorbing the ink liquid. A damper spring 66 is secured to the left end of the slidable member 56. The liquid absorptive pad 64 is forced to contact a front surface 68 of the nozzle 14 when the slidable member 56 is shifted right to clean the orifice portion 60 of the nozzle 14.

A solenoid mechanism 70 and a set lever 72 are disposed at the housing wall 46. The set lever 72 is rotatably supported around a shaft 74, and rotated in the direction shown by an arrow 76 when the solenoid mechanism 70 is activated. The phantom line 78 shows a condition when the solenoid mechanism 70 is activated. In the normal condition, the set lever 72 is held at the location shown by the solid line. In the activated condition, the set lever 72 contacts the damper spring 66 to shift right the slidable member 56. The solenoid mechanism 70 includes a coil, a plunger, a link for converting the reciprocating movement of the plunger to the rotating movement of the shaft 74, and a spring for depressing the set lever 72 toward the normal position shown by the solid line.

Figure 1:
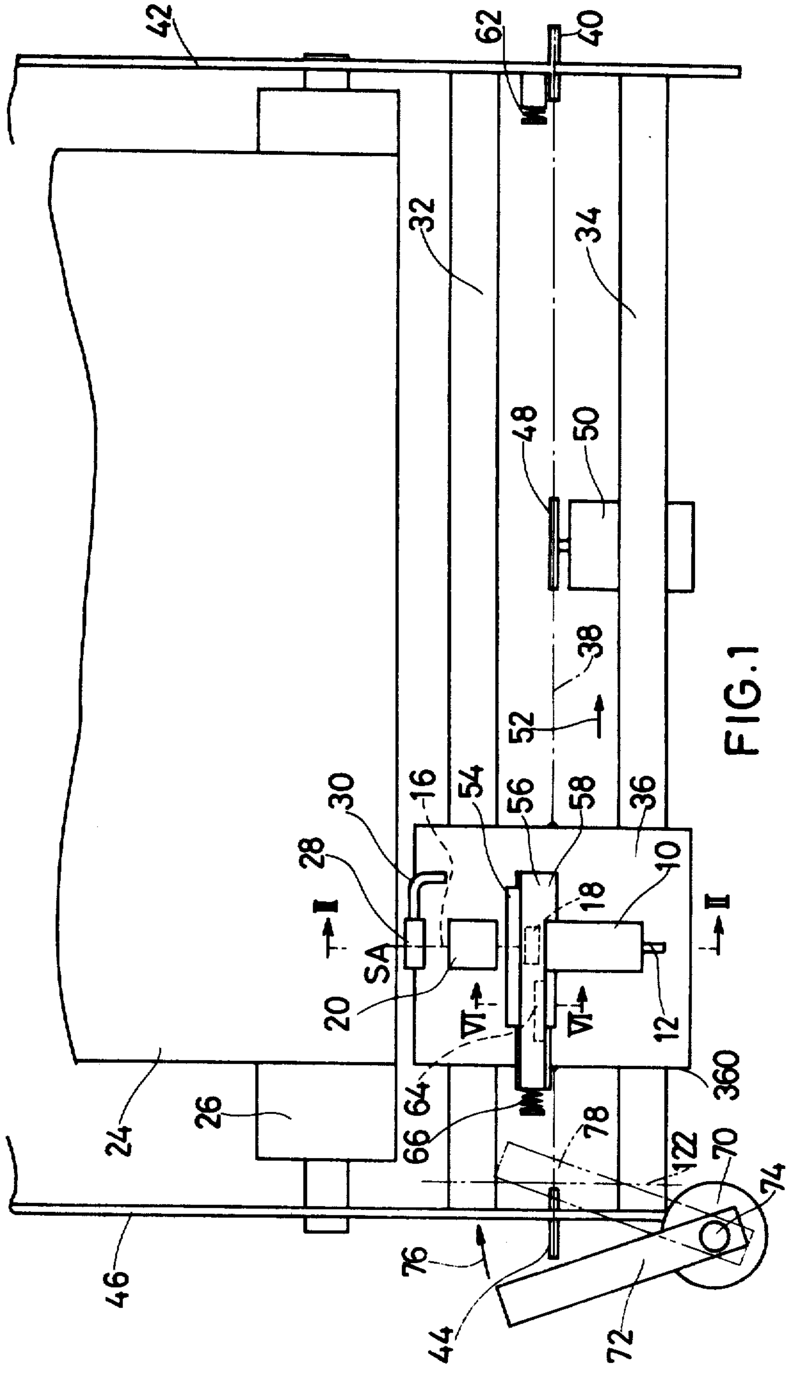
FIG. 1 is a plan view of an essential part of an ink jet system printer of the charge amplitude controlling type employing an embodiment of a nozzle cleaning device of the present invention.
Figure 7:
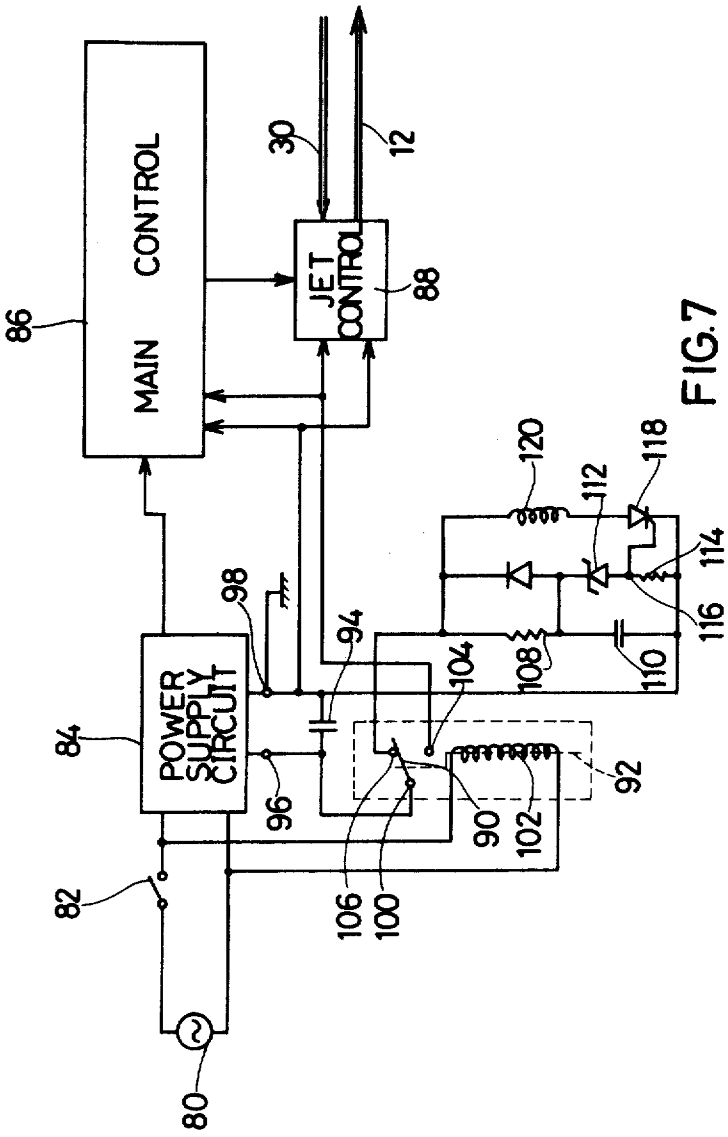
FIG. 7 is a circuit diagram of a control system of the ink jet system printer of the charge amplitude controlling type of FIG. 1.

FIG. 7 shows a control system of the ink jet system printer of the charge amplitude controlling type of FIG. 1.

The ink jet system printer is supplied with power from a commercial power supply 80 through a main power switch 82. A power supply circuit 84 is provided to activate a main control circuit 86 and a jet control circuit 88 via a relay switch 90 of a relay 92. The main control circuit 86 develops control signals for controlling the charging operation and for activating the motor 50 which drives the carriage 36. The jet control circuit 88 activates the electromechanical transducer attached to the nozzle 14, and the ink liquid supply pump and the electromagnetic valve included in the ink liquid supply system. A capacitor 94 is disposed between two output terminals 96 and 98 of the power supply circuit 84. The output terminal 96 is connected to a common terminal 100 of the relay switch 90. The relay 92 includes a relay coil 102 which is connected to the commercial power supply 80 via the main power switch 82.

A first relay contact 104 of the relay switch 90 is connected to the main control circuit 86 and the jet control circuit 88. A second relay contact 106 is connected to the output terminal 98, which is grounded, via a series circuit including a resistor 108 and a capacitor 110. A series circuit including an inversely disposed Zener diode 112 and a resistor 114 is connected to the capacitor 110 in a parallel fashion. A node 116 provided between the Zener diode 112 and the resistor 114 is connected to the gate electrode of a thyristor 118. A series circuit including a coil 120 of the solenoid mechanism 70 and the thyristor 118 is disposed between the second relay contact 106 and the output terminal 98. When the relay coil 102 is not energized, the common terminal 100 of the relay switch 90 is connected to the second relay contact 106. When the relay coil 102 is energized, the common terminal 100 is connected to the first relay contact 104.

When the main power switch 82 is initially OFF, the left side wall 360 of the carriage 36 is held at a position shown by a phantom line 122 in FIG. 1. The set lever 72 is located at the position shown by the solid line and, therefore, the set lever 72 does not contact the damper spring 66.

When the main power switch 82 is thrown, the relay coil 102 is energized to connect the common terminal 100 of the relay switch 90 to the first relay contact 104. Thus, the main control circuit 86 and the jet control circuit 88 are supplied with power. Moreover, the capacitor 94 is charged to the level identical with with voltage difference between the output terminals 96 and 98. The motor 50 functions to drive the carriage 36 in the forward direction 52. After travelling the entire width, the slidable member 56 contacts the damper spring 62. Therefore, the slidable member 56 is held at its left-most position, wherein the stopper 58 contacts the ink droplet issuance unit 10 to ensure an accurate alignment of the nozzle 14 and the charging tunnel 18.

Then, the carriage 36 is returned to the home position 122 by the rotation of the motor 50. Thereafter, the carriage 36 is driven to travel in the forward direction 52 to conduct the actual printing operation. When the actual printing operation is completed, the carriage 36 is returned to the home position 122 and held stationary.

Under these conditions, when the main power switch 82 is switched off, the relay coil 102 is deenergized. The common terminal 100 of the relay switch 90 is connected to the second relay contact 106. The charges stored on the capacitor 94 flow to the capacitor 110 through the resistor 108. When the voltage appearing across the capacitor 110 exceeds the break-down voltage of the Zener diode 112, the Zener diode 112 becomes conductive to activate the thyristor 118. Thus, the coil 120 of the solenoid mechanism 70 is energized by the current derived from the capacitor 94. More specifically, when a preselected period of time, for example, one second has passed after the turning off of the main power switch 82, the Zener diode 112 and the thyristor 118 are switched on to energize the solenoid mechanism 70.

Figure 3:
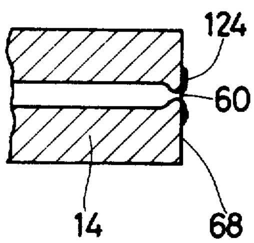
FIG. 3 is a sectional view of a nozzle included in the ink jet system printer of the charge amplitude controlling type of FIG. 1.
Figure 4:
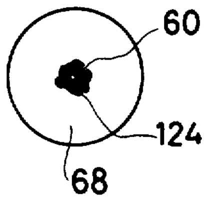
FIG. 4 is a front view of the nozzle of FIG. 3.

When the solenoid mechanism 70 is energized, the set lever 72 is rotated in the direction shown by the arrow 76 to shift right the slidable member 56 via the damper spring 66. The liquid absorptive pad 64 contacts the front surface 68 of the nozzle 14 to clean ink liquid 124 (see FIGS. 3 and 4) attached to the front surface 68 around the orifice portion 60. When the capacitor 94 is discharged out, the thyristor 118 is switched off to deenergize the coil 120 of the solenoid mechanism 70. Therefore, the set lever 72 is returned to the normal position shown by the solid line in FIG. 1.

When the main power switch 82 is again thrown, the carriage 36 is first driven to travel in the forward direction 52 by the motor 50. The slidable member 56 contacts the damper spring 62 which functions to shift left the slidable member 56. The stopper 58 contacts the ink droplet issuance unit 10, whereby the axis of the charging tunnel 18 is adjusted to the orifice portion 60 of the nozzle 14. Thereafter, the carriage 36 is returned to the home position 122. Then, the carriage 36 is driven to travel forward to conduct the actual printing operation. While the actual printing operation is conducted, the solenoid mechanism 70 is never energized to hold the set lever 72 at the normal position shown by the solid line in FIG. 1.

In the foregoing embodiment, the cleaning pad 64 is kept in contact with the front surface 68 of the nozzle 14 as long as the main power switch 82 is off. Therefore, there is a possibility that the ink liquid contained in the nozzle 14 is absorbed by the cleaning pad 64 through the orifice portion 60.

Figure 8:
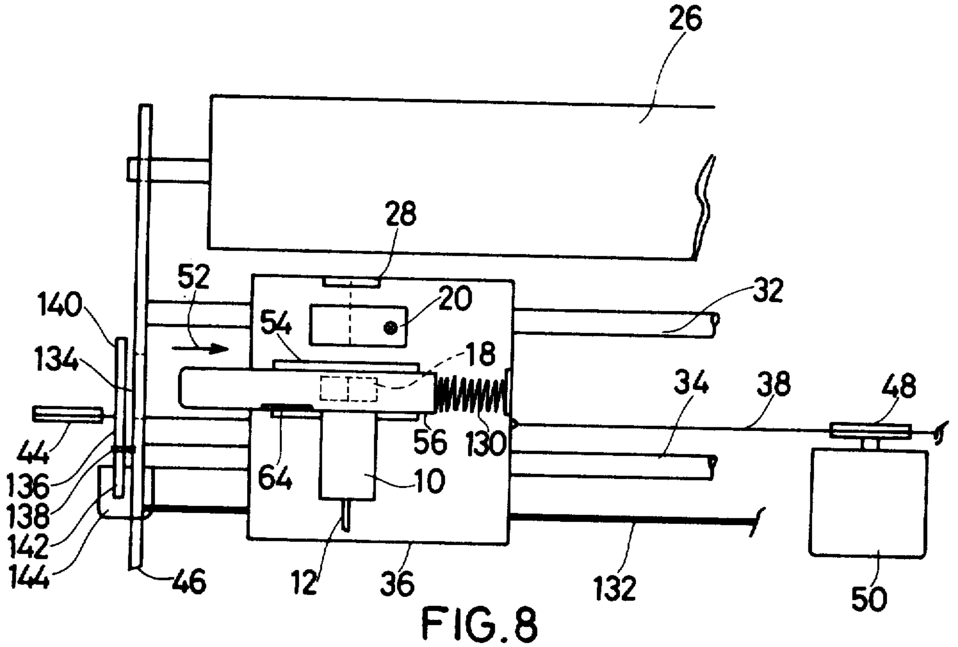
FIG. 8 is a plan view of an essential part of an ink jet system printer of the charge amplitude controlling type employing another embodiment of a nozzle cleaning device of the present invention.
Figure 9:
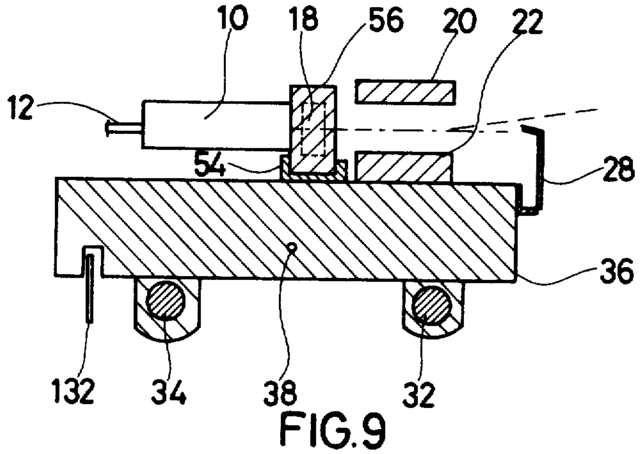
FIG. 9 is a sectional view of a printer head included in the ink jet system printer of the charge amplitude controlling type of FIG. 8.

FIG. 8 shows another embodiment of the nozzle cleaning device of the present invention, wherein the nozzle cleaning operation is conducted only when the main power switch is thrown. FIG. 9 shows a printer head portion of the ink jet system printer of FIG. 8. Like elements corresponding to those of FIG. 1 are indicated by like numerals.

A spring 130 is disposed between the right end of the slidable member 56 and the right end of the carriage 36 in order to depress the slidable member 56 leftward so that the axis of the charging tunnel 18 confronts the orifice portion 60 of the nozzle 14. As in the case of the embodiment 6f FIG. 1, when the slidable member 56 is shifted right, the liquid absorptive pad 64 contacts the front surface 68 of the nozzle 14.

A timing slit plate 132 is disposed to parallel the pair of guide rails 32 and 34 for detecting the location of the carriage 36. More specifically, an optical detection device or a magnetic detection device is secured to the carriage 36 for detecting slits formed in the timing slit plate 132, thereby developing a position indicating pulse. When the carriage 36 is positioned at the home position, a home position indicating signal TH is developed. When the carriage 36 is positioned at the leftmost position, a leftmost position indicating signal TS is developed.

An opening 134 is formed in the housing wall 46 at a position corresponding to the slidable member 56 so that the slidable member 56 is extruded through the opening 134 when the carriage 36 is located at the leftmost position. A rotatable lever 136 is rotatably secured to the housing wall 46 through the use of a pin 138. One end 140 of the rotatable lever 136 functions to cover the opening 134 when the other end 142 of the rotatable lever 136 is driven to rotate by a solenoid mechanism 144. When the solenoid mechanism 144 is deenergized, the rotatable lever 136 is returned to its initial position to uncover the opening 134.

When the main power is not supplied to the system, the carriage 36 is held stationary at the home position. When the main power supply is thrown under these conditions, the carriage is driven to travel leftward to reach the leftmost position. Further, in response to the power thrown, the solenoid mechanism 144 is energized so that the rotatable lever 136 covers the opening 134. Therefore, the left end of the slidable member 56 contacts the rotatable lever 136. The slidable member 56 is shifted right against the spring 130 to clean the front surface 68 of the nozzle 14 through the use of the liquid absorptive pad 64.

When the carriage 36 has reached the leftmost position, the leftmost position indicating signal TS is developed. In response to the leftmost position indicating signal TS, a control system develops a control signal for driving the carriage 36 rightward. The solenoid mechanism 144 is deenergized to uncover the opening 134. Further, the slidable member 56 is returned to its leftmost position by means of the spring 130 so that the charging tunnel 18 confronts the orifice portion 60 of the nozzle 14. That is, the cleaning device of this embodiment cleans the front surface 68 of the nozzle 14 when the main power supply is thrown. Thereafter, the slidable member 56 is held at the normal position wherein the charging tunnel 18 confronts the orifice portion 60 of the nozzle 14.

Figure 10:
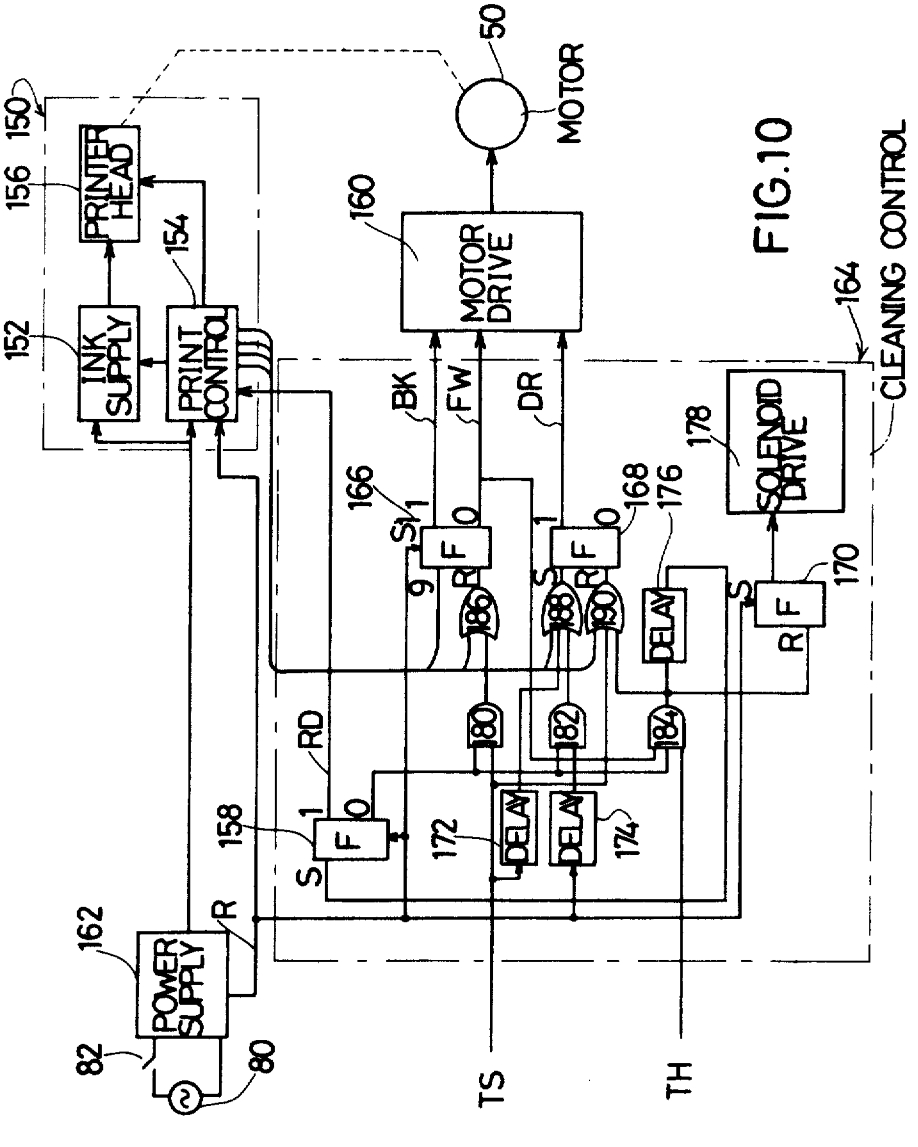
FIG. 10 is a block diagram of a control system of the ink jet system printer of the charge amplitude controlling type of FIG. 8.

The above-mentioned operation is controlled by a control system shown in FIG. 10.

An ink jet mechanism 150 comprises an ink liquid supply system 152, a print control circuit 154 and a printer head 156 (carriage 36) driven to reciprocate by the motor 50. The print control circuit 154 is placed in an operative condition when a flip-flop 158 is set to develop a print ready signal RD. A motor drive circuit 160 is connected to the motor 50 for driving the motor 50 to move the carriage 36 leftward when a backward signal BK is applied thereto and to move the carriage 36 rightward when a forward signal FW is applied thereto. The driving operation is conducted when a drive instruction signal DR is applied to the motor drive circuit 160.

A power supply circuit 162 receives a power supply from the commercial power supply 80 via the main power switch 82. The power supply circuit 162 develops an initial reset signal R upon throwing of the main power switch 82. A cleaning control circuit 164 comprises the flip-flop 158, flip-flops 166, 168, 170, delay circuits 172, 174, 176 and a solenoid drive circuit 178. The cleaning control circuit 164 further includes AND gates 180, 182 and 184, and OR gates 186, 188 and 190.

The flip-flop 158 develops the print ready signal RD when the flip-flop 158 is set as discussed above. The initial reset signal R is applied to the flip-flop 158. The reset output of the flip-flop 158 is applied to the AND gates 180, 182 and 184. The flip-flop 166 develops a control signal for determining the travelling direction of the carriage 36. The flip-flop 166 is set by the initial reset signal R. The set output of the flip-flop 166 is applied to the motor drive circuit 160 as the backward signal BK. The reset output of the flip-flop 166 is applied to the motor drive circuit 160 as the forward signal FW. The flip-flop 168 develops the drive instruction signal DR toward the motor drive circuit 160 when the flip-flop 168 is in the set state. The flip-flop 170 is set by the initial reset signal R, and the set output of the flip-flop 170 activates the solenoid drive circuit 178.

As already discussed above, when the carriage 36 reaches the leftmost position, the leftmost position indicating signal TS is developed, which is applied to the AND gate 180, the delay circuit 172 and the OR gate 190. The output signal of the AND gate 180 is applied to the reset input terminal of the flip-flop 166 via the OR gate 186. The output signal of the delay circuit 172 is applied to the set input terminal of the flip-flop 168 via the OR gate 188. The output signal of the OR gate 190 is applied to the reset input terminal of the flip-flop 168.

When the carriage 36 is located at the home position, the home position indicating signal TH is developed.

The home position indicating signal TH is applied to the AND gate 184.

The output signal of the AND gate 184 is applied to the delay circuit 176, the OR gate 190 and the reset input terminal of the flip-flop 170. Therefore, when the home position indicating signal TH is developed and the AND gate 184 becomes ON, the flip-flop 170 is reset to deenergize the solenoid drive circuit 178. Further, the output signal of the delay circuit 176 functions to set the flip-flop 158, thereby developing the print ready signal RD.

The operation sequence is as follows. When the main power switch 82 is thrown, the initial reset signal R is developed from the power supply circuit 162. The flip-flop 158 is reset to enable the AND gates 180, 182 and 184. The flip-flops 166 and 170 are set. Further, the initial reset signal R is applied to the delay circuit 174. The set output of the flip-flop 166 is applied to the motor drive circuit 160 as the backward signal BK. The set output of the flip-flop 170 is applied to the selonoid drive circuit 178, whereby the rotatable lever 136 is driven to rotate to cover the opening 134.

Thereafter, the delay circuit 174 develops the output signal to set the flip-flop 168 via the AND gate 182 and the OR gate 188. The set output of the flip-flop 168 is applied to the motor drive circuit 160 as the drive instruction signal DR. Upon receiving the drive instruction signal DR, the motor drive circuit 160 develops a control signal for rotating the motor 50 backward, thereby driving the carriage 36 to travel leftward. The left end of the slidable member 56 contacts the rotatable lever 136 through the opening 134 and, therefore, the slidable member 56 is shifted right. The liquid absorptive pad 64 contacts the front surface 68 of the nozzle 14 to clean the ink liquid 124 attached to the front surface 68 of the nozzle 14 around the orifice portion 60.

When the carriage 36 reaches the leftmost position, the leftmost position indicating signal TS is developed. The leftmost position indicating signal TS functions to reset the flip-flop 168 via the OR gate 190, thereby stopping the motor 50. The AND gate 180 becomes ON by the leftmost position indicating signal TS so that the flip-flop 166 is reset via the OR gate 186. Thus, the flip-flop 166 develops the forward signal FW toward the motor drive circuit 160. The leftmost position indicating signal TS is further applied to the delay circuit 172. The delayed output signal of the delay circuit 172 functions to set the flip-flop 168 via the OR gate 188. The motor drive circuit 160 receives the forward signal FW and the drive instruction signal DR, thereby rotating the motor 50 forward. Accordingly, the carriage 36 is driven to travel rightward.

When the carriage 36 reaches the home position, the home position indicating signal TH is developed. The AND gate 184 is turned ON to reset the flip-flop 168 via the OR gate 190 and to reset the flip-flop 170. The motor rotation is interrupted to hold the carriage 36 at the home position. Further, the solenoid drive circuit 178 is deenergized to uncover the opening 134. The output signal of the AND gate 184 is applied to the delay circuit 176. The delayed output signal of the delay circuit 176 functions to set the flip-flop 158, thereby developing the print ready signal RD toward the print control circuit 154.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A nozzle cleaning device in an ink jet system printer which includes a nozzle for emitting ink droplets, comprising:

a liquid absorptive pad;

a support member for supporting said liquid absorptive pad and also supporting a charging tunnel for charging the ink droplets in accordance with print information;

shift means for shifting said support member in front of said nozzle; and control means for activating said shift means so that said liquid absorptive pad contacts a front surface of said nozzle when said nozzle does not emit the ink droplets, and that said liquid absorptive pad is held away from said front surface of said nozzle when said nozzle emits the ink droplets.

2. The nozzle cleaning device of claim 1, wherein said control means comprises:

first means for shifting said support member to a first position wherein said liquid absorptive pad contacts the front surface of said nozzle; and second means for holding said support member at a second position wherein said charging tunnel confronts said nozzle.

3. The nozzle cleaning device of claim 2, wherein said first means is energized at a time when a main power supply switch of the ink jet system printer is thrown.

4. The nozzle cleaning device of claim 3, wherein said second means includes a spring for depressing said support member in a predetermined direction.

5. A nozzle cleaning device in an ink jet system printer which includes a nozzle for emitting ink droplets, comprising:

a liquid absorptive pad;

a support member for supporting said liquid absorptive pad and also supporting a charging tunnel for charging the ink droplets in accordance with print information;

shift means for shifting said support member in front of said nozzle in a direction perpendicular to the direction of the emitting ink droplets; and control means for activating said shift means so that said liquid absorptive pad contacts a front surface of said nozzle when said nozzle does not emit the ink droplets, and that said liquid absorptive pad is held away from said front surface of said nozzle when said nozzle emits the ink droplets.

6. The nozzle cleaning device of claim 5, wherein said control means comprises:

first means for shifting said support member to a first position wherein said liquid absorptive pad contacts the front surface of said nozzle; and second means for holding said support member at a second position wherein said charging tunnel confronts said nozzle.

7. The nozzle cleaning device of claim 6, wherein said first means is energized at a time when a main power supply switch of the ink jet system printer is thrown.

8. The nozzle cleaning device of claim 7, wherein said second means includes a spring for depressing said support member in a predetermined direction.

* * * * *